(12) United States Patent
Imai et al.

(10) Patent No.: US 10,929,468 B2
(45) Date of Patent: Feb. 23, 2021

(54) INTERACTION CONTROL METHOD, INTERACTION CONTROL APPARATUS, AND NON-TRANSITORY COMPUTER-READABLE STORAGE MEDIUM

(71) Applicant: FUJITSU LIMITED, Kawasaki (JP)

(72) Inventors: Takashi Imai, Atsugi (JP); Kei Taira, Kawasaki (JP); Takumi Baba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 16/115,605

(22) Filed: Aug. 29, 2018

(65) Prior Publication Data
US 2019/0065622 A1    Feb. 28, 2019

(30) Foreign Application Priority Data
Aug. 31, 2017 (JP) .................................. 2017-167749

(51) Int. Cl.
| G06F 16/00 | (2019.01) |
| G06F 16/9032 | (2019.01) |
| G06F 16/9535 | (2019.01) |
| G06N 5/00 | (2006.01) |
| G06F 40/30 | (2020.01) |
| G10L 15/22 | (2006.01) |

(52) U.S. Cl.
CPC .. *G06F 16/90328* (2019.01); *G06F 16/90332* (2019.01); *G06F 16/9535* (2019.01); *G06F 40/30* (2020.01); *G06N 5/00* (2013.01); *G10L 15/22* (2013.01)

(58) Field of Classification Search
CPC ............... G06F 16/90328; G06F 40/30; G06F 16/90332; G06F 16/9535; G10L 15/22; G06N 5/00; G06N 5/027; G06N 3/008; G06N 5/04
See application file for complete search history.

(56) References Cited

U.S. PATENT DOCUMENTS 9,817,383 B1 * 11/2017 Sinha ................. G05B 13/0205
2005/0010951 A1    1/2005 Saito et al.
2016/0327921 A1 * 11/2016 Ribbich ................. G06F 3/041

FOREIGN PATENT DOCUMENTS

JP    2004-343320    12/2004

* cited by examiner

*Primary Examiner* — Usmaan Saeed
*Assistant Examiner* — Paul Kim
(74) *Attorney, Agent, or Firm* — Fujitsu Patent Center

(57) ABSTRACT

An interaction control method performed by a computer includes: executing a selection process that includes selecting any of one or more of interaction blocks generated by decomposing content into interaction units, and outputting the selected interaction block; executing a determination process that includes determining a reaction of a user to the outputted interaction block; and executing a response process that includes selecting a next action of the determined reaction based on a result of the determination process.

20 Claims, 12 Drawing Sheets

| BLOCK ID | CONTENT OF UTTERANCE | SERVICE NAME | EXECUTION CONDITION | REACTION | NEXT ACTION | ... |
|---|---|---|---|---|---|---|
| A-00X | TYPHOON NO. ● IS APPROACHING | ●● NEWS | WEATHER | WHAT'S WEATHER LIKE TOMORROW? | "TOMORROW'S WEATHER" | |
| B-00X | RAIN IS FORECAST FOR THIS EVENING IN TOKYO | WEATHER ●● | WEATHER SCHEDULE OF GOING OUT | ... | | |
| C-00X | SCHEDULE FOR TONIGHT'S PROFESSIONAL BASEBALL GAMES | SPORTS ●● | BASEBALL (TEAM NAME) | ... | | |
| D-00X | TODAY'S RECOMMENDED RECIPE | COOK ●● | DINNER MENU ... | I HAVE NO "INGREDIENTS" TELL ME HOW TO COOK I WANT TO ORDER HOME DELIVERY ... | EXECUTION OF INTERACTION BLOCK EXECUTION OF INTERACTION BLOCK FOR DETAILED WAY OF COOKING IN RECIPE USING OTHER INGREDIENTS GENERATION OF INTERACTION BLOCK FOR RESERVATION SITE | |
| E-00X | COUPON FOR TODAY ONLY OF BAR | ●● RESERVATION | PARTY RESTAURANT ... | ... | | |
| ... | | | | | | |

221

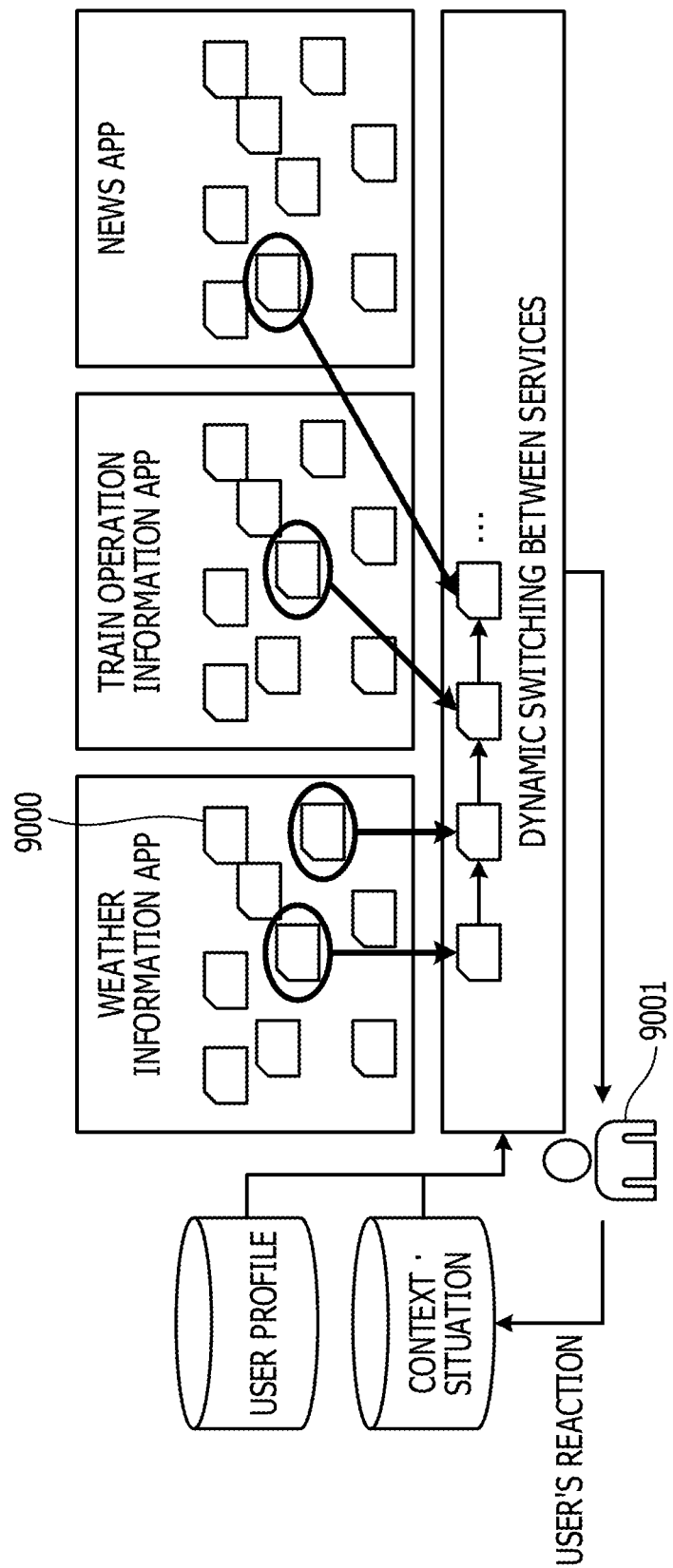

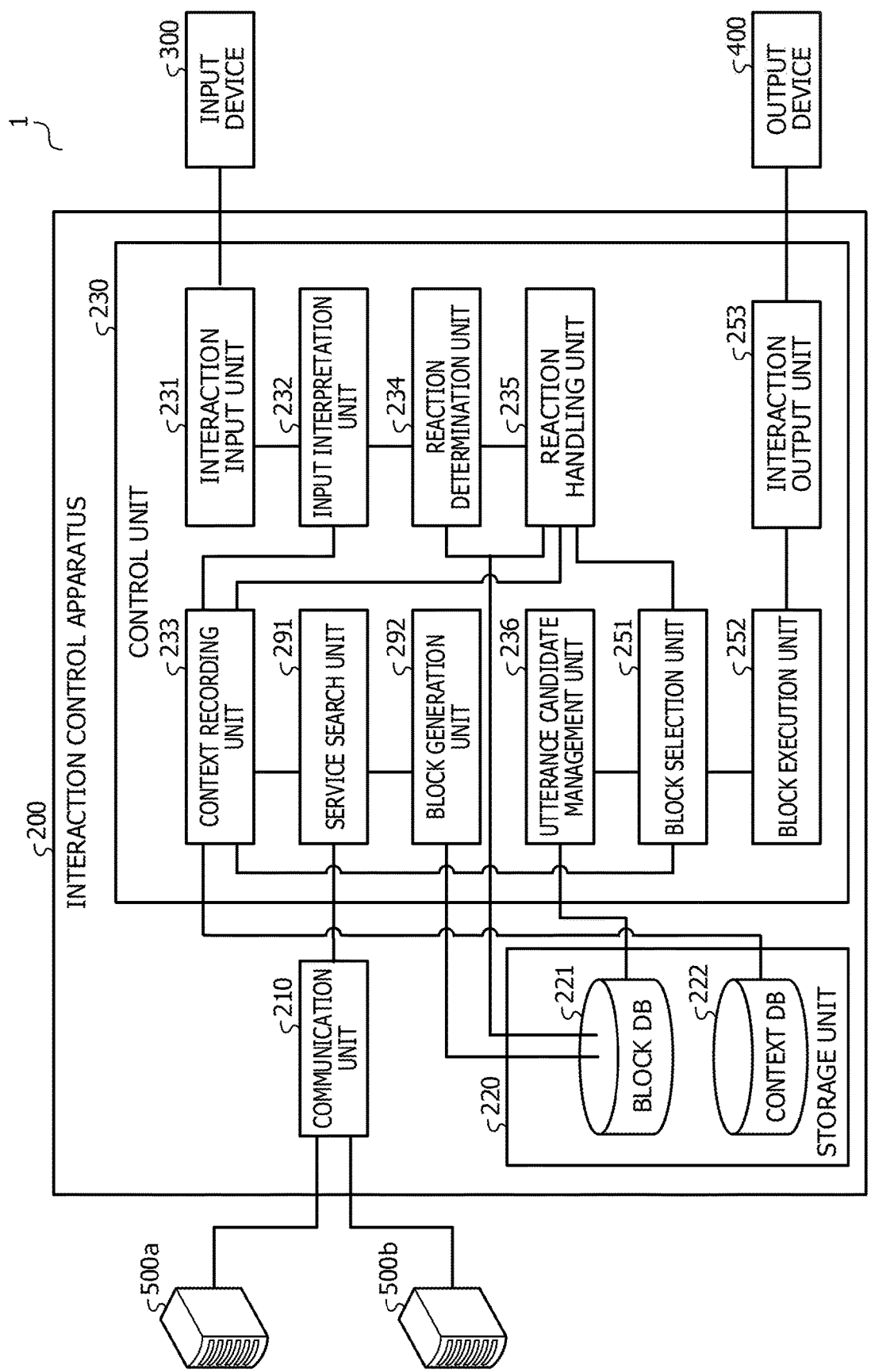

FIG. 3

| BLOCK ID | CONTENT OF UTTERANCE | SERVICE NAME | EXECUTION CONDITION | REACTION | NEXT ACTION | ... |
|---|---|---|---|---|---|---|
| A-00X | TYPHOON NO. ● IS APPROACHING | ●● NEWS | WEATHER | WHAT'S WEATHER LIKE TOMORROW? | "TOMORROW'S WEATHER" | |
| B-00X | RAIN IS FORECAST FOR THIS EVENING IN TOKYO | WEATHER ●● | WEATHER SCHEDULE OF GOING OUT | ... | | |
| C-00X | SCHEDULE FOR TONIGHT'S PROFESSIONAL BASEBALL GAMES | SPORTS ●● | BASEBALL (TEAM NAME) | ... | | |
| D-00X | TODAY'S RECOMMENDED RECIPE | COOK ●● | DINNER MENU | I HAVE NO "INGREDIENTS" TELL ME HOW TO COOK I WANT TO ORDER HOME DELIVERY | EXECUTION OF INTERACTION BLOCK EXECUTION OF INTERACTION BLOCK FOR DETAILED WAY OF COOKING IN RECIPE USING OTHER INGREDIENTS GENERATION OF INTERACTION BLOCK FOR RESERVATION SITE | |
| E-00X | COUPON FOR TODAY ONLY OF BAR | ●● RESERVATION | PARTY RESTAURANT | ... | | |
| ... | | | | | | |

221

INTERACTION CONTROL METHOD, INTERACTION CONTROL APPARATUS, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-167749, filed on Aug. 31, 2017, the entire contents of which are incorporated herein by reference.

FIELD

The embodiments discussed herein are related to an interaction control method, an interaction control apparatus, and a non-transitory computer-readable storage medium for storing an interaction control program.

BACKGROUND

There is a technique that interactively suggests information to a user. As an example, there is provided an information processing apparatus that causes changes in user's preference to be appropriately reflected and appropriately infers a user's interest in a newly added attribute to make it possible to recommend content closer to the user's interest. The information processing apparatus deliberately selects interest data having a low degree of importance from among interest data to select a suggestion to the user. The information processing apparatus receives input of a response to a suggested query and changes (updates) the interest data in accordance with the content of the response.

An example of the related art is Japanese Laid-open Patent Publication No. 2004-343320.

SUMMARY

According to an aspect of the invention, an interaction control method performed by a computer includes: executing a selection process that includes selecting any of one or more of interaction blocks generated by decomposing content into interaction units, and outputting the selected interaction block; executing a determination process that includes determining a reaction of a user to the outputted interaction block; and executing a response process that includes selecting a next action of the determined reaction based on a result of the determination process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of presentation of interaction blocks with which services are dynamically switched;

FIG. 2 illustrates an example of an interaction system in a first embodiment;

FIG. 3 illustrates an example of a block DB in the first embodiment;

DESCRIPTION OF EMBODIMENTS

Figure 4A:
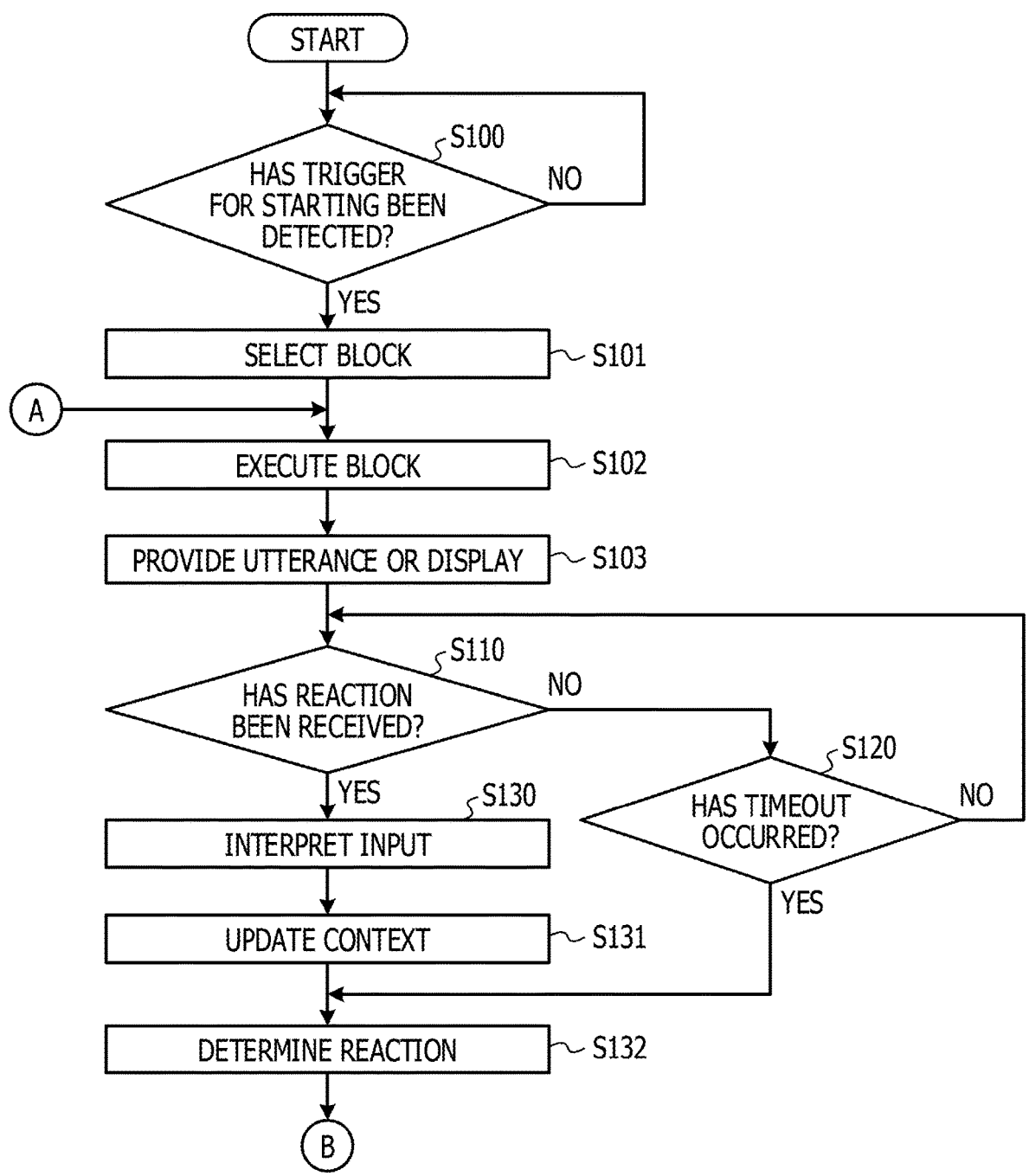
FIGS. 4A and 4B are a flowchart illustrating an example of an interaction control process in the first embodiment.

The above-described technique is based on the assumption that all topics of candidates to be suggested are structured and stored in a database. For example, the above-described information processing apparatus has a dialogue database in which a model for generating a query to be displayed to the user is stored, and generates a query by incorporating part or all of interest data into the model.

On the other hand, information and communication technology (ICT) services that are published on the Internet and provide information to a user range over news sites, sites for introducing restaurants, sites for introducing recipes, and so forth, for example. ICT services differ from each other in data structure, and thus it is difficult to handle information as common structured data. For this reason, in the above-described technique, it is impossible to convert a wide range of information provided by published ICT services to a common format to generate common structured data, and select the data to suggest the data to the user.

In one aspect, there is provided an interaction control apparatus, an interaction control method, and an interaction control program that each make it possible to provide information related to a service demanded by a user.

Embodiments of an interaction control apparatus, an interaction control method, and an interaction control program disclosed herein will be described in detail below with reference to the drawings. Note that these embodiments are not intended to limit the disclosed technique. Furthermore, the following embodiments may be appropriately combined within a range in which no contradiction occurs.

First Embodiment

An interaction control apparatus in a first embodiment interacts with a user by using, as a medium, a robot (interaction robot), such as a therapy robot or an entertainment robot, that interacts with humans in a friendly way. In this embodiment, an interaction with the user is performed by selecting an interaction block in accordance with a profile, such as age, occupation, and gender, of the user, the context of the interaction, a situation, and so forth, and executing the interaction block.

In this embodiment, an interaction block is an executable unit of interaction including "the content of an utterance to the user", "an execution condition", and "a next action appropriate to a reaction of the user after the utterance". An interaction block includes, as the content of an utterance, but is not limited to, a sentence displayed on a screen or output by voice, for example. For example, an interaction block may include content, such as a photo or video, or may be a link for accessing another web service.

The interaction control apparatus in this embodiment accesses, for example, an app that provides weather information, news, or the like, or an ICT service, such as a web site, extracts content of the app or the ICT service, and decomposes the content to generate an interaction block. For example, the interaction control apparatus accesses a weather information app and generates an interaction block including an utterance, such as "It is likely to rain tonight".

The interaction control apparatus outputs, for example, an utterance included in an interaction block by voice to execute the interaction block. In the case where an interaction block is content, such as a photo or video, the interaction control apparatus plays the content to execute the interaction block. Furthermore, an interaction block may be a link for accessing another web service. In this case, the interaction control apparatus executes the interaction block to call up the web service.

Then, the interaction control apparatus executes a next action in response to a reaction of the user to the executed interaction block. For example, if the reaction of the user coincides with a condition of a reaction included in the executed interaction block, the interaction control apparatus executes a next action corresponding to the reaction. As an action to be executed in response to a reaction, the interaction control apparatus also stores a change in context state due to the reaction, for example. If an interaction block in which the reaction of the user coincides with a condition is not found, the interaction control apparatus may generate and execute a new interaction block as an action to be executed in response to the reaction. The reaction is an example of a reaction of the user.

A flow of an interaction performed by the interaction control apparatus in this embodiment will be described with reference to FIG. 1. FIG. 1 illustrates an example of presentation of interaction blocks with which services are dynamically switched. In FIG. 1, for example, an interaction control apparatus 200 to be described executes an interaction block 9000 generated from a weather information app to start an interaction. For example, the interaction control apparatus 200 makes an utterance, such as "It is likely to rain tonight". In response to this, a user 9001 makes a reaction of asking for a detailed explanation of weather information, such as "What is the probability of rain in Tokyo?", for example. In this case, the interaction control apparatus 200 executes an interaction block generated from the weather information to make an utterance, such as "The probability of rain in Tokyo after 19:00 is 60%", for example, in response to the reaction of the user 9001.

On the other hand, in some cases, the user 9001 makes a reaction of asking for information unrelated to weather information, such as "Give me information about transfer from Yokohama to Akihabara". In this case, the interaction control apparatus 200 searches for a train operation information app. Then, the interaction control apparatus 200 generates and executes an interaction block including the content of an utterance, such as "The train is delayed because of a fire along the railway track near ○○ station".

Then, in response to this, if the user 9001 makes a reaction, such as "Give me more information about the fire", the interaction control apparatus 200 accesses not the train operation information app but a news app to generate and execute an interaction block. For example, the interaction control apparatus 200 downloads a video about news of the fire from the news app to cause the video to serve as an interaction block. In this case, the interaction control apparatus 200 plays the downloaded video to execute the interaction block.

As just described, the interaction control apparatus 200 in this embodiment executes an interaction block to thereby control an interaction with the user instead of using a dialogue database in which a trigger and an utterance, or a question and an answer are stored in association with each other based on a specific scenario. That is, the interaction control apparatus in this embodiment has interaction blocks obtained by decomposing pieces of content of a plurality of services into interactive forms and selects an interaction block in accordance with a reaction of the user to make an utterance, thus making it possible to provide information related to a service demanded by the user without a scenario.

[Functional Block]

Next, an interaction system in this embodiment will be described with reference to FIG. 2. FIG. 2 illustrates an example of an interaction system in the first embodiment. An interaction system 1 illustrated in FIG. 2 includes the interaction control apparatus 200, an input device 300, an output device 400, and external servers 500a and 500b. Hereinafter, the external servers 500a and 500b may simply be referred to as "external servers 500" in the case where the external servers 500a and 500b are represented with no distinction between them being made.

In this embodiment, the interaction control apparatus 200 is connected to the input device 300, the output device 400, and the external servers 500 in such a manner as to be able to communicate with them via wireless or wired communication. Although FIG. 2 illustrates the interaction system 1 including two external servers 500, the number of external servers 500 is an example. The interaction system 1 may include three or more external servers 500.

The interaction control apparatus 200 generates and executes an interaction block, and selects and executes a next interaction block in accordance with a reaction of the user to the content of an utterance of the interaction block. The interaction control apparatus 200 is implemented by, but not limited to, an interaction robot, for example. The interaction control apparatus 200 may be implemented by a server computer capable of performing wireless or wired communication with the interaction robot, or may be implemented in the cloud.

The input device 300 receives input of an interaction performed by the user. The input device 300 is implemented by, but not limited to, a microphone and/or a camera, for example. The input device 300 may be implemented by various sensors, such as a thermometer and an acceleration sensor. Furthermore, the input device 300 may include an operation unit via which the user operates the input device 300.

The output device 400 outputs an utterance or the like resulting from execution of an interaction block to the user. The output device 400 is implemented by, but not limited to, a speaker and/or a display, for example. The output device 400 may be implemented by a vibrator and/or a strobe, for example.

The input device 300 and the output device 400 are able to be implemented by, but not limited to, a microphone and a speaker included in the interaction robot, for example. The input device 300 and the output device 400 may be implemented by a microphone and a speaker included in a portable electronic device, such as a smartphone or tablet, or a stationary computer.

Each external server 500 is a server providing an ICT service that distributes various pieces of information. Examples of an ICT service include, but are not limited to, news distribution sites, weather information sites, and train operation information sites. Sites that provide ICT services in a broad sense, such as social networking service (SNS) sites, may be included.

Furthermore, the interaction control apparatus 200 may generate an interaction block by using not information acquired from the external server 500 but information acquired from various pieces of application software (apps), which are not illustrated, installed on the interaction control apparatus 200, for example.

Next, an example of the interaction control apparatus in this embodiment will be described. As illustrated in FIG. 2, the interaction control apparatus 200 in this embodiment includes a communication unit 210, a storage unit 220, and a control unit 230.

The communication unit 210 controls, for example, communication with other computers, such as the external servers 500, regardless of wired or wireless communication. The communication unit 210 is, for example, a communication interface, such as a network interface card (NIC).

The storage unit 220 stores, for example, various pieces of data of programs and so forth executed by the control unit 230. Furthermore, the storage unit 220 includes a block DB 221 and a context DB 222. The storage unit 220 corresponds to a semiconductor memory device, such as a random access memory (RAM), a read only memory (ROM), or a flash memory, or a storage device, such as a hard disk drive (HDD). Hereinafter, "database" may be referred to as "DB".

The block DB 221 stores information on an interaction block. FIG. 3 illustrates an example of a block DB in the first embodiment. As illustrated in FIG. 3, the block DB 221 stores, for example, "content of utterance", "service name", "execution condition", "reaction", and "next action" in association with "block ID". Information stored in the block DB 221 is input by a block generation unit 292 to be described, for example.

In FIG. 3, "block ID" stores an identifier that uniquely identifies each interaction block. A first alphabetic letter of each block ID corresponds to "service name", for example. "Content of utterance" stores the content of an utterance to be output to the user in the case where the interaction block is executed. "Service name" stores an ICT service from which information related to the corresponding interaction block has been acquired.

In FIG. 3, "execution condition" stores an event serving as a trigger for executing the corresponding interaction block. "Execution condition" is, for example, a specified time, or a specific word or phrase uttered by the user. Furthermore, an instance in which a specific interaction block has already been executed, or an instance in which a context is in a specific state may be stored as "execution condition".

In FIG. 3, "reaction" stores a plurality of conditions on a conceivable reaction made by the user when the corresponding interaction block is executed. As "reaction", for example, there are a conceivable word or phrase uttered by the user, startup of a specific app, access to a web page, and so forth. Furthermore, with respect to a reaction, there are conceivably an instance in which the content of an utterance of the interaction block is affirmed, and an instance in which the content of the utterance is denied.

Reactions of the user in this embodiment also include the case where a timeout occurs without any reaction of the user in addition to an active action of the user, such as the user's utterance of some words or the user's operation of a terminal. Furthermore, in the case where, for example, a camera or various sensors are used as the input device 300, various gestures, such as a nod of the user's head, may be detected as a reaction.

In FIG. 3, "next action" stores an action to be executed next by the interaction control apparatus 200 when a reaction that coincides with a condition stored in "reaction" is detected. As "next action", there are conceivably selection and execution of a specific interaction block, setting of a context state, startup of a specific web service, and so forth. As "next action", there may be stored generation and execution of an appropriate interaction block when the appropriate interaction block has not been generated.

Referring back to FIG. 2, the context DB 222 stores information on a context created based on an interaction block and a reaction of the user to the interaction block, and a user profile including attributes, such as the age, gender, and occupation of the user, personal preferences, and so forth.

The context DB 222 stores, for example, a present topic (such as weather, sports, or meals) in an interaction with the user, an interaction block that has been executed so far, and a received reaction of the user to the interaction block. Furthermore, the context DB 222 stores information on user's preferences, such as user's favorite sports, and the fields of news that the user is interested in. Thus, the interaction control apparatus 200 avoids duplication of the same topic, thereby making it possible to provide information related to a service demanded by the user.

The control unit 230 is a processing unit that manages an overall process performed by the interaction control apparatus 200. The control unit 230 is implemented by, for example, a central processing unit (CPU), a micro processing unit (MPU), or the like executing a program stored in an internal storage device using a RAM serving as a work area. The control unit 230 may also be implemented by, for example, an integrated circuit, such as an application specific integrated circuit (ASIC) or a field programmable gate array (FPGA).

The control unit 230 includes an interaction input unit 231, an input interpretation unit 232, a context recording unit 233, a reaction determination unit 234, a reaction handling unit 235, and an utterance candidate management unit 236. The control unit 230 further includes a block selection unit 251, a block execution unit 252, an interaction output unit 253, a service search unit 291, and the block generation unit 292. The interaction input unit 231, the input interpretation unit 232, the context recording unit 233, the reaction determination unit 234, the reaction handling unit 235, and the utterance candidate management unit 236 are an example of an electronic circuit included in a processor or an example of a process executed by the processor. Similarly, the utterance candidate management unit 236, the block selection unit 251, the block execution unit 252, the interaction output unit 253, the service search unit 291, and the block generation unit 292 are also an example of an electronic circuit included in the processor or an example of a process executed by the processor.

The interaction input unit 231 receives input of an utterance made by the user or a reaction of the user to an interaction block through the input device 300. The interaction input unit 231 outputs information on the input utterance or reaction to the input interpretation unit 232.

The input interpretation unit 232 interprets the reaction of the user received by the interaction input unit 231 and outputs an interpretation result to the context recording unit 233 and the reaction determination unit 234. The input interpretation unit 232 is an example of an interpretation unit.

The input interpretation unit 232 recognizes a voice included in the reaction by using, for example, a publicly known voice recognition technology, and interprets a word or phrase included in the voice. The input interpretation unit 232 determines, for example, whether a word or phrase included in the voice is affirmative or negative. For example, if a phrase, such as "I'll have that" or "Give me more information", is included in the reaction, the input interpretation unit 232 determines that the reaction is affirmative. Furthermore, for example, if a word, such as "another" or "different", is included in the reaction, the input interpretation unit 232 determines that the reaction is negative.

Furthermore, if a word or phrase indicating a specific attribute, such as a place, is input in response to the content of an utterance (slot filling), the input interpretation unit 232 identifies the attribute as the content of the reaction. For example, if a place, such as "Tokyo", is indicated in response to the content of an utterance about tomorrow's weather, it is determined that the user wants to know "weather in Tokyo". Similarly, if the user specifies a time, such as "tonight", it is determined that the user wants to know "tonight's weather".

Furthermore, if the content of an utterance includes a plurality of options, the input interpretation unit 232 determines which option is included in the reaction. For example, if the content of an utterance is about tonight's dinner and if options, such as "restaurant reservation", "home delivery", and "recipe", are indicated, the input interpretation unit 232 determines which option is included in the reaction.

Even if only part of the above-described content is included in the reaction, the input interpretation unit 232 may determine the content of the reaction. For example, with respect to an option of "restaurant reservation", if only one word, such as "restaurant" or "reservation", is included, the input interpretation unit 232 may determine that "restaurant reservation" has been selected.

The context recording unit 233 manages a context regarding an interaction, and the user profile. When the context recording unit 233 receives an interpretation result output from the input interpretation unit 232, the context recording unit 233 updates a context in a present interaction. For example, when a reaction about tonight's weather is received from the user after an interaction block about a restaurant reservation has been executed, the context recording unit 233 updates a context stored in the context DB 222 from "restaurant" to "weather".

Furthermore, the context recording unit 233 updates, based on the output interpretation result, the user profile. For example, when the context recording unit 233 determines that the user has repeatedly made an affirmative reaction to an interaction block about "high school baseball", the context recording unit 233 adds "high school baseball" to a category that the user is interested in. On the other hand, when the user repeatedly makes a negative reaction to "recipe", the context recording unit 233 may delete "recipe" from the category that the user is interested in.

When the context recording unit 233 detects a trigger for starting an interaction, the context recording unit 233 outputs an instruction to the block selection unit 251 to select an interaction block to cause an interaction to be started. Furthermore, when a reaction of the user to an interaction block is input, the context recording unit 233 stores an interpretation result provided by the input interpretation unit 232 in the context DB 222. The context recording unit 233 is an example of a context management unit.

An example of a trigger for starting an interaction is, but not limited to, an event in which the interaction input unit 231 receives an instruction from the user to start an interaction. For example, when a predetermined time comes, or when a predetermined time period has elapsed since a previous interaction ended, the context recording unit 233 may cause an interaction to be started. Furthermore, the context recording unit 233 may use, as a trigger for starting an interaction, another certain event, such as an event in which information on a news flash is received.

Furthermore, in the case where various sensors are used as the input device 300, an interaction may be started by using, as a trigger, various sensing results, such as the case where a temperature exceeds 30° C., the case where an event is detected in which the user has fallen down, and so forth. Thus, such a sensing and recommending method makes it possible to promote a more active interaction.

When the context recording unit 233 detects a trigger for ending an interaction, the context recording unit 233 may cause an interaction control process to be ended. The context recording unit 233 detects, as a trigger for ending an interaction, for example, the case where a reaction of making a request to end an interaction, such as "Be back later", is received from the user, or the case where a timeout occurs without any response from the user.

The reaction determination unit 234 determines, based on an interpretation result, whether a reaction of the user coincides with a condition included in an interaction block. The reaction determination unit 234 outputs, to the reaction handling unit 235, a determination result as to the reaction. The reaction determination unit 234 is an example of a determination unit.

The reaction handling unit 235 executes a next action based on the determination result as to the reaction. The reaction handling unit 235 executes an action stored in "next action" with reference to the block DB 221. For example, when an interaction block is stored as "next action", the reaction handling unit 235 outputs information on the interaction block to the block selection unit 251. The reaction handling unit 235 is an example of a response unit.

The utterance candidate management unit 236 manages an interaction block stored in the block DB 221. In response to a request from the block selection unit 251, the utterance candidate management unit 236 extracts, from the block DB 221, an interaction block candidate corresponding to the request and outputs the interaction block candidate to the block selection unit 251. The utterance candidate management unit 236 is an example of a candidate management unit.

The block selection unit 251 outputs a request for an interaction block to the utterance candidate management unit 236, and selects an interaction block that fits a condition from among interaction block candidates. The block selection unit 251 is an example of a selection unit.

The block selection unit 251 selects an interaction block in the following order of priority, for example. First, the block selection unit 251 regards, as a command, a specific word included in a reaction of the user to an immediately preceding interaction block uttered, and selects an interaction block corresponding to the command. When the reaction determination unit 234 determines that a reaction of the user to an immediately preceding interaction block uttered coincides with a condition stored in the block DB 221, the block selection unit 251 executes the reaction. Furthermore, when a reaction does not coincide with a condition, the block selection unit 251 selects an interaction block from a wide range by using a context of an immediately preceding utterance or the like made by the user, and the user profile, such as information on user's preferences and words related to the information, and executes the interaction block. The block selection unit 251 may randomly select an interaction block based on a context, the user profile, and so forth.

The block execution unit 252 executes an interaction block selected by the block selection unit 251. For example, the block execution unit 252 causes the interaction output unit 253 to output the content of an utterance included in the selected interaction block. The block execution unit 252 is an example of an execution unit.

Furthermore, for example, if the selected interaction block includes startup of a specific app or access to a specific web service, the block execution unit 252 starts the app or accesses the web service.

The interaction output unit 253 causes the output device 400 to output the content of an utterance included in the interaction block executed by the block execution unit 252.

The service search unit 291 acquires information used for generating an interaction block. For example, the service search unit 291 accesses the external server 500 and acquires information provided by an ICT service. Furthermore, the service search unit 291 may start an app, which is not illustrated, installed on the interaction control apparatus 200, and acquire information used for generating an interaction block from the app. The service search unit 291 outputs the acquired information used for generating an interaction block to the block generation unit 292. The service search unit 291 is an example of a search unit.

The block generation unit 292 generates an interaction block by using information acquired by the service search unit 291 and stores the interaction block in the block DB 221. For example, when the service search unit 291 acquires a really simple syndication, RDF site summary, or rich site summary (RSS) feed, the block generation unit 292 stores, as "content of utterance", a headline or text included in the RSS feed. The block generation unit 292 stores, as "service name", the name of an ICT service from which the service search unit 291 has acquired information. The block generation unit 292 is an example of a generation unit.

Furthermore, the block generation unit 292 stores, as "execution condition", the genre of information provided by the ICT service, a word or phrase appearing frequently in the text included in the RSS feed, and so forth. Similarly, the block generation unit 292 may further store, as "execution condition", hours during which and a day of the week on which that genre of information is likely to be accessed, weather conditions, and a word or phrase related to that genre of information, for example.

For example, in the case where the block generation unit 292 generates an interaction block by using information extracted from a recipe site, the block generation unit 292 stores, as "content of utterance", the name, ingredients, and so forth of a dish, such as "stir-fried meat with vegetables". Furthermore, the block generation unit 292 stores, as "execution condition", a time at which many users start to cook a dish, such as "16:00 on weekdays", words related to recipes, such as "dinner" and "menu", and so forth.

Furthermore, the block generation unit 292 stores a conceivable reaction of the user to the "content of utterance", a next action to be executed when the reaction is made, and so forth. For example, in generating an interaction block about a recipe, the block generation unit 292 stores, as "reaction", a reaction of the user of affirming the content of an utterance, such as "I'll have that" or "Give me more information". In this case, the block generation unit 292 stores, as "next action", that is, as a next action to be executed in response to the reaction, an interaction block including a detailed recipe for the dish, and so forth.

The block generation unit 292 may further store a user's reaction negative to the content of an utterance, such as "I have no 'ingredients' (green peppers, carrots, and so forth)", or a user's reaction of asking for an alternative, such as "I want to order home delivery". In this case, the block generation unit 292 may store, as "next action", an interaction block about recipes using no 'ingredients', such as green peppers, carrots, and so forth, indicated in the reaction, for example. Furthermore, the block generation unit 292 may store, as "next action", an action of accessing "reservation site" to generate and execute an interaction block, for example.

As just described, the block generation unit 292 in this embodiment may generate an interaction block by using not only information whose format is fixed, such as a television program listing, but also information in a variety of formats of ICT services in general. Furthermore, an interaction block in this embodiment includes not only a mere combination of a question and an answer but also a variety of next actions appropriate to reactions of the user. Thus, variety of pieces of information may be provided one after another in accordance with a user's interest without being restricted by a fixed scenario.

[Flow of Process]

Figure 4B:
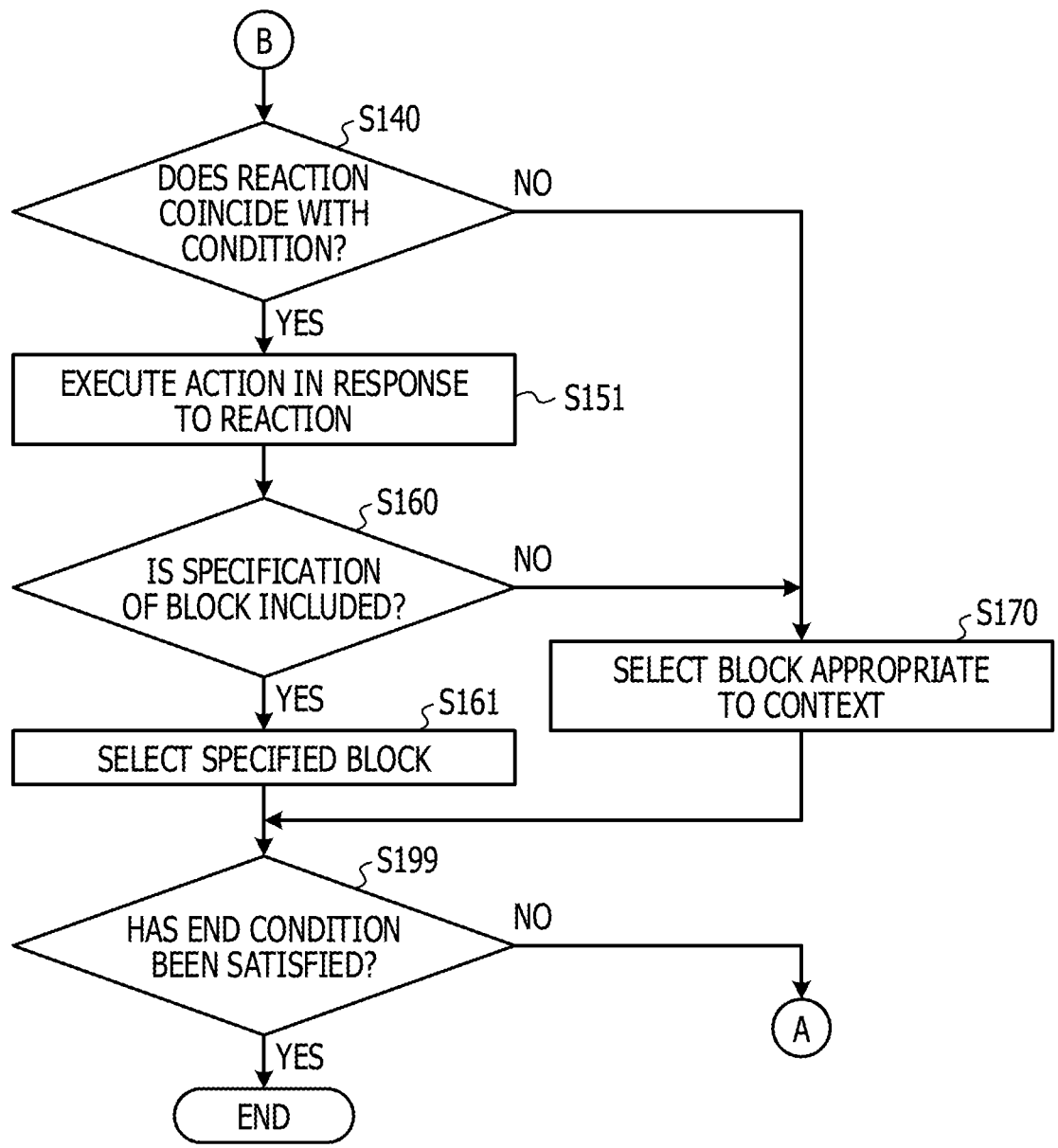
Figure 5:
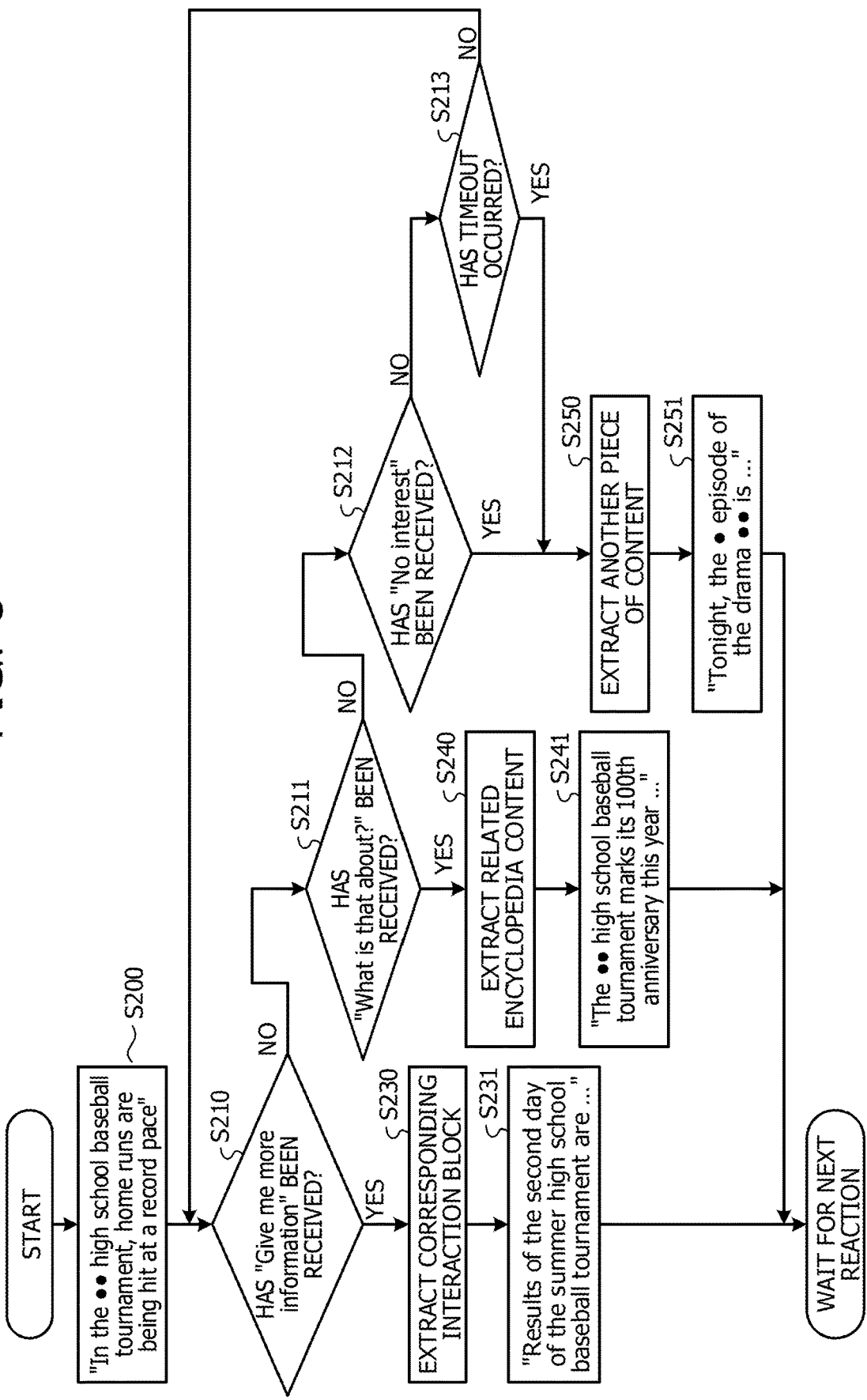
FIG. 5 is a flowchart illustrating an example of a flow of an interaction in the first embodiment.

Next, a process in this embodiment will be described with reference to FIGS. 4 to 6. FIG. 4 (i.e. FIGS. 4A and 4B) is a flowchart illustrating an example of an interaction control process in the first embodiment. As illustrated in FIG. 4, the context recording unit 233 of the control unit 230 waits until it detects a trigger for starting an interaction via the interaction input unit 231, for example (No in S100).

When the context recording unit 233 determines that it has detected a trigger for starting an interaction (Yes in S100), the context recording unit 233 outputs an instruction to the block selection unit 251 to select an interaction block. The block selection unit 251 selects an interaction block with reference to the block DB 221 and outputs the interaction block to the block execution unit 252 (S101). The block execution unit 252 executes the output interaction block (S102). When the output interaction block is, for example, the content of an utterance, the block execution unit 252 causes the interaction output unit 253 to output the content of the utterance by voice, or to display the content of the utterance in characters (S103).

Then, the interaction input unit 231 determines whether it has received input of a reaction from the user through the input device 300 (S110). When the interaction input unit 231 determines that it has not received any input of a reaction from the user (No in S110), the interaction input unit 231 waits until a timeout occurs (No in S120). When the interaction input unit 231 determines that a timeout has occurred (Yes in S120), the process proceeds to S132.

When the interaction input unit 231 determines that it has received input of a reaction (Yes in S110), the interaction input unit 231 outputs the input reaction to the input interpretation unit 232. The input interpretation unit 232 interprets the output reaction and outputs an interpretation result to the context recording unit 233 and the reaction determination unit 234 (S130). The context recording unit 233 updates the context DB 222 based on the output interpretation result (S131).

Then, the reaction determination unit 234 determines, based on the interpretation result, whether the reaction of the user coincides with a condition included in the interaction block (S132). Furthermore, when it is determined in S120 that a timeout has occurred, the reaction determination unit 234 also determines whether the reaction of the user coincides with a condition included in a timeout interaction block.

When it is determined that the reaction of the user coincides with a condition (Yes in S140), the reaction handling unit 235 executes an action to be executed in response to the reaction of the user with reference to the block DB 221 (S151). Furthermore, the reaction handling unit 235 determines whether specification of a next interaction block is included in the action to be executed in response to the reaction (S160). When it is determined that specification of a next interaction block is included (Yes in S160), the block selection unit 251 selects a specified interaction block (S161). Subsequently, the process proceeds to S199.

On the other hand, when it is determined that the reaction of the user does not coincide with a condition (No in S140), the block selection unit 251 selects an interaction block that fits a context and the user profile with reference to the context DB 222 (S170).

Then, the context recording unit 233 determines whether an end condition for ending the interaction has been satisfied (S199). When the context recording unit 233 determines that an end condition has not been satisfied (No in S199), the process returns back to S102 and is repeated. On the other hand, when the context recording unit 233 determines that an end condition has been satisfied (Yes in S199), the process ends.

Next, a flow of an interaction performed in the interaction control process illustrated in FIG. 4 will be described. FIG. 5 is a flowchart illustrating an example of a flow of an interaction in the first embodiment. As illustrated in FIG. 5, the interaction control apparatus 200 selects, with reference to the block DB 221, an interaction block including the content of an utterance, such as "In the ●● high school baseball tournament, home runs are being hit at a record pace", for example, and causes the interaction block to be uttered (S200).

When interaction control apparatus 200 receives a reaction of making a request for detailed information about the content of the utterance, such as "Give me more information", for example (Yes in S210), the interaction control apparatus 200 extracts, with reference to the block DB 221, an interaction block corresponding to the content of the utterance (S230). Then, the interaction control apparatus 200 selects an interaction block including the content of an utterance, such as "Results of the second day of the summer high school baseball tournament are . . . ", for example, and causes the interaction block to be uttered (S231). Then, the interaction control apparatus 200 waits until the user makes a next reaction.

On the other hand, when interaction control apparatus 200 does not receive any reaction of making a request for detailed information about the content of the utterance (No in S210), the interaction control apparatus 200 determines whether it has received a reaction of making a request for a summary of the content of the utterance, such as "What is that about?", for example (S211). When the interaction control apparatus 200 determines that it has received a reaction of making a request for a summary of the content of the utterance (Yes in S211), the interaction control apparatus 200 accesses, for example, the external server 500, such as an encyclopedia site, and extracts related content (S240). Then, the interaction control apparatus 200 generates and executes an interaction block, such as "The ●● high school baseball tournament marks its 100th anniversary this year . . . ", for example (S241). Then, the interaction control apparatus 200 waits until the user makes a next reaction.

On the other hand, when the interaction control apparatus 200 does not receive any reaction of making a request for a summary of the content of the utterance (No in S211), the interaction control apparatus 200 determines whether it has received a reaction of expressing no interest in the content of the utterance, such as "No interest", for example (S212). When the interaction control apparatus 200 receives a reaction of expressing no interest in the content of the utterance (Yes in S212), the interaction control apparatus 200 accesses the external server 500 and extracts another piece of content unrelated to the content of the utterance (S250). For example, the interaction control apparatus 200 accesses a television program information site, and generates and executes an interaction block, such as "Tonight, the ● episode of the drama ●● is . . . ", (S251). Then, the interaction control apparatus 200 waits until the user makes a next reaction.

Furthermore, for example, when the interaction control apparatus 200 does not receive any reactions (No in S212) and determines that a timeout has occurred (Yes in S213), the interaction control apparatus 200 may extract another piece of content unrelated to the content of the utterance (S250).

Next, a flow of an interaction performed in the case where an interaction block includes a plurality of options will be described. FIG. 6 is a flowchart illustrating another example of a flow of an interaction in the first embodiment. In the following description, steps with the same reference numerals as those illustrated in FIG. 5 refer to similar steps, and detailed description thereof is omitted.

Figure 6:
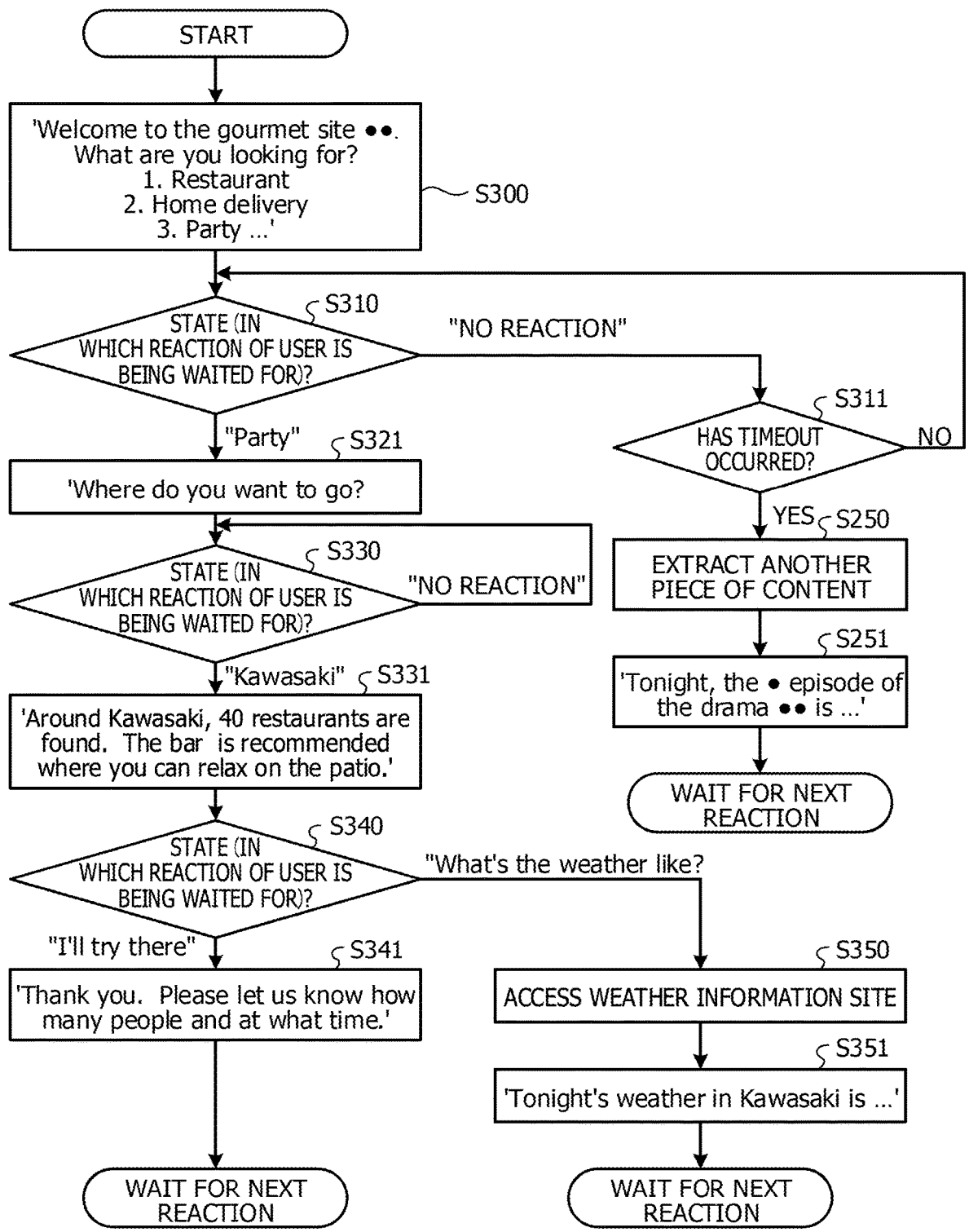
FIG. 6 is a flowchart illustrating another example of a flow of an interaction in the first embodiment.

In the example illustrated in FIG. 6, the interaction control apparatus 200 selects, with reference to the block DB 221, as an interaction block, an interaction block including, as a reaction, options, such as "restaurant", "home delivery", "party", and so forth, for example, and causes the interaction block to be uttered (S300). Subsequently, the interaction control apparatus 200 waits until the user makes a reaction ("no reaction" in S310). The interaction control apparatus 200 waits for a reaction of the user until a timeout occurs (No in S311). When a timeout occurs without any response from the user (Yes in S311), the interaction control apparatus 200 proceeds to S250.

When the interaction control apparatus 200 receives a reaction of specifying any of the options, such as "Party", for example ("Party" in S310), the interaction control apparatus 200 extracts, with reference to the block DB 221, an interaction block corresponding to the reaction. Then, the interaction control apparatus 200 executes an interaction block including the content of an utterance, such as 'Where do you want to go?', (S321), and waits until the user makes a reaction ("no reaction" in S330).

When the interaction control apparatus 200 receives a reaction of specifying a place, such as "Kawasaki", for example ("Kawasaki" in S330), the interaction control apparatus 200 executes a next interaction block. In this embodiment, the interaction control apparatus 200 accesses a restaurant reservation site and executes an interaction block including, as the content of an utterance, search results related to "Kawasaki" (S331). The interaction control apparatus 200 causes the content of an utterance to be output, such as "Around Kawasaki, 40 restaurants are found. The . . . is recommended where . . . on the patio", for example. Then, the interaction control apparatus 200 waits until the user makes a next reaction (S340).

In this case, when the user makes an affirmative reaction, such as "I'll try there", ("I'll try there" in S340), the interaction control apparatus 200 executes a next interaction block. In this embodiment, the interaction control apparatus 200 selects and executes an interaction block for asking for input of information involved in a restaurant reservation. The interaction control apparatus 200 causes the content of an utterance to be output, such as "Thank you. Please let us know how many people and at what time.", for example (S341), and waits for a next reaction.

On the other hand, when the user makes an inconceivable reaction, such as "What's the weather like?", ("What's the weather like?" in S340), the interaction control apparatus 200 selects and executes an interaction block about weather. In this embodiment, the interaction control apparatus 200 accesses a weather information site, and selects and executes an interaction block including, as the content of an utterance, a search result (S350). The interaction control apparatus 200 causes the content of an utterance to be output, such as "Tonight's weather in Kawasaki is . . . ", for example (S351), and waits for a next reaction.

As described above, the interaction control apparatus in this embodiment selects and presents an interaction block generated by decomposing content into interaction units. The interaction control apparatus in this embodiment determines a reaction of the user to the presented interaction block. Furthermore, the interaction control apparatus in this embodiment selects, based on a determination result as to the reaction of the user, a next response or an interaction block. That is, the interaction control apparatus defines an interaction block corresponding to one back-and-forth interaction from ICT services having different data structures, and thus is able to generate a database for making a determination as to an interaction. This makes it possible to provide information related to a service demanded by the user.

Furthermore, the interaction control apparatus in this embodiment searches for web content of an ICT service on the Internet. The interaction control apparatus decomposes the web content of the ICT service searched for into one back-and-forth interaction (interaction unit) including "content of utterance" and "conceivable reaction of user" to generate an interaction block. Then, the interaction control apparatus instructs the generation unit to generate an interaction block based on a determination result as to a reaction of the user, and selects the generated interaction block. This makes it possible to generate an interaction block appropriate to a service demanded by the user in real time.

Furthermore, the interaction control apparatus in this embodiment manages an interaction block including an interaction action, a condition for identifying a reaction of the user to the interaction action, and a definition of and an execution condition for a system action to be executed in response to the reaction of the user. The interaction control apparatus manages a context in an interaction and a user profile, and selects an interaction block by using a context in an interaction and the user profile. This makes it possible to provide information related to a service demanded by the user in accordance with a context in an interaction and the user profile.

Furthermore, the interaction control apparatus in this embodiment executes a selected interaction block based on an execution condition included in the interaction block, interprets a reaction of the user to the executed interaction block, and causes an interpretation result to be reflected in the context management unit. The interaction control apparatus selects, based on the interpretation result, a next response or an interaction block. This makes it possible to provide information related to a service demanded by the user in accordance with a reaction of the user in an interaction.

Furthermore, when it is determined that a reaction of the user is affirmative or a conceivable reaction, the interaction control apparatus in this embodiment selects an interaction block related to an interaction block to which the user has reacted. When it is determined that a reaction of the user is negative or an inconceivable reaction, the interaction control apparatus selects an interaction block remotely related to the interaction block to which the user has reacted. Thus, in an interaction, in both the case where the user reacts affirmatively and the case where the user reacts negatively, pieces of information related to a service demanded by the user may be provided one after another.

Second Embodiment

Although the embodiment of the disclosed technique has been described, the disclosed technique may be implemented by various different embodiments other than the above-described embodiment. Although, as an example, the configuration has been described in which an interaction block is selected and executed in accordance with a reaction of the user, a major emergency, such as an earthquake or accident, occurs during an interaction in some cases. A configuration will be described in which a highly urgent utterance candidate is selected at this time. A process in a second embodiment is able to be implemented by a configuration equivalent to that of the interaction control apparatus 200 illustrated in FIG. 2, and thus detailed description of functional blocks is omitted.

[Flow of Process]

Figure 7A:
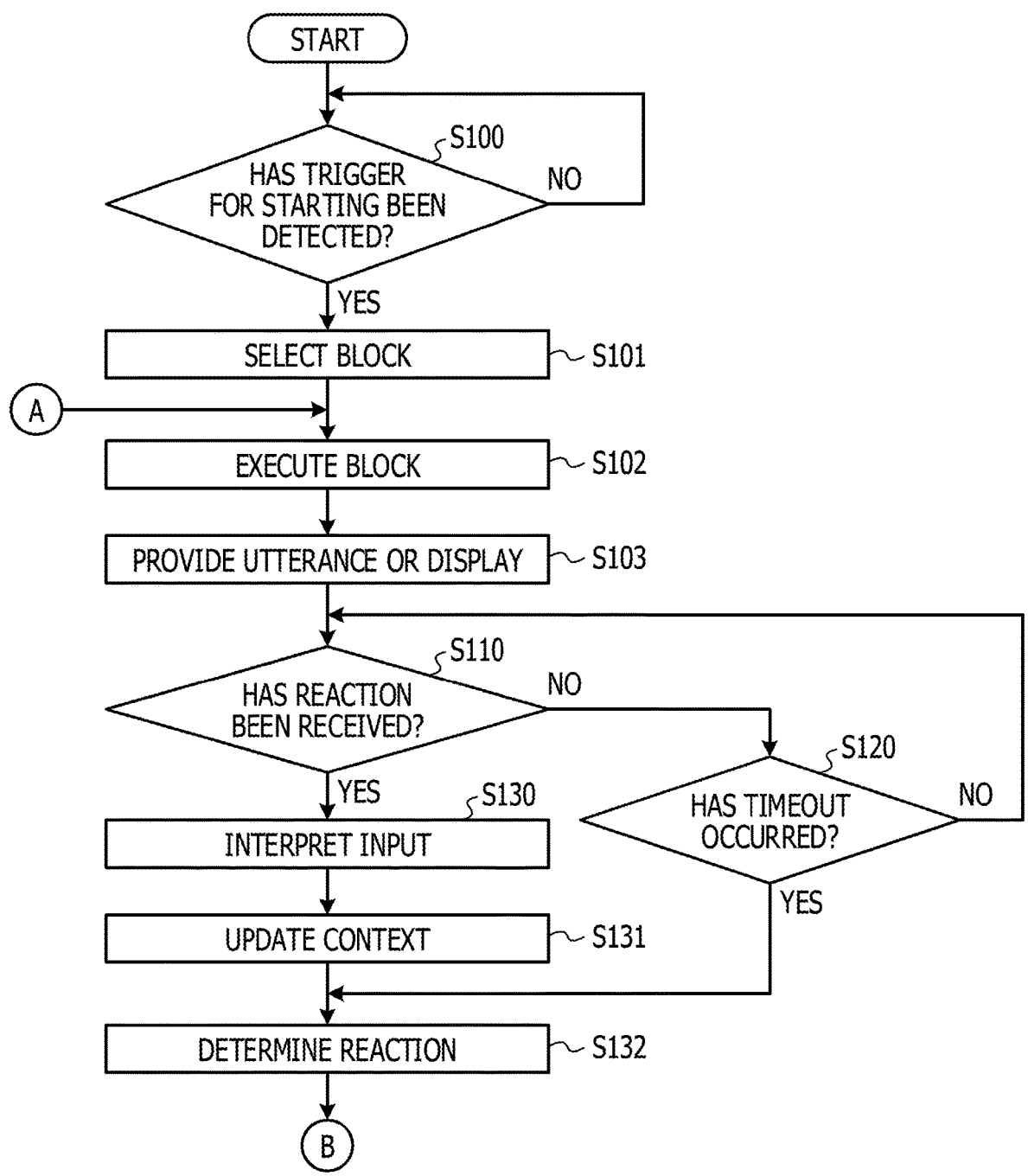
FIGS. 7A and 7B are a flowchart illustrating an example of an interaction control process in a second embodiment.
Figure 7B:
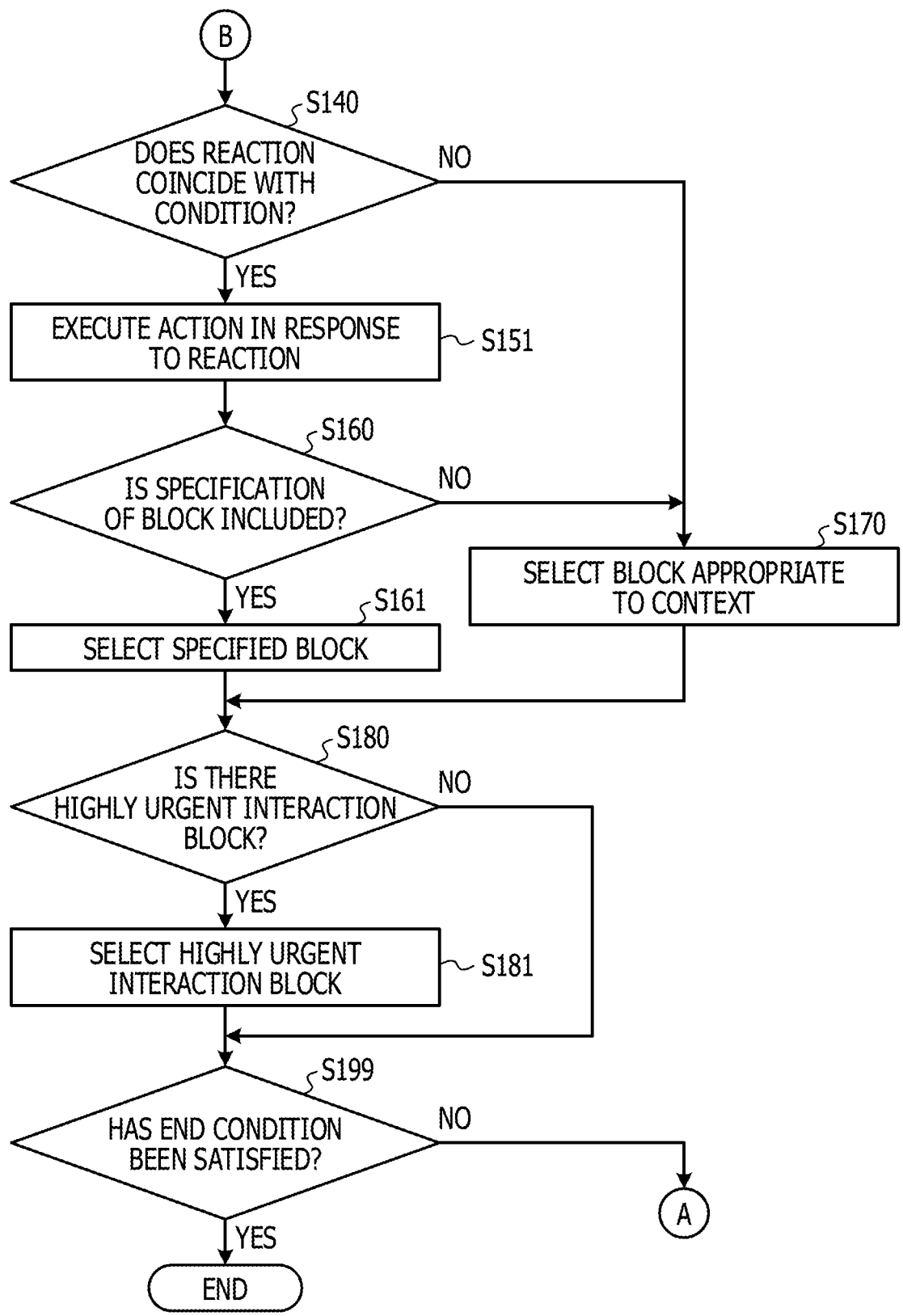

A process in this embodiment will be described with reference to FIG. 7. FIG. 7 (i.e. FIGS. 7A and 7B) is a flowchart illustrating an example of an interaction control process in the second embodiment. In the following description, steps with the same reference numerals as those illustrated in FIG. 4 refer to similar steps, and detailed description thereof is omitted.

When a specified interaction block is selected (S161), or when an interaction block appropriate to a context is selected (S170), the block selection unit 251 of the interaction control apparatus 200 in this embodiment determines whether there is a highly urgent interaction block (S180). When the block selection unit 251 determines that there is no highly urgent interaction block (No in S180), the process proceeds to S199.

When the block selection unit 251 determines that there is a highly urgent interaction block (Yes in S180), the block selection unit 251 selects the highly urgent interaction block in place of the interaction block selected in S161 or S170 (S181). Subsequently, the process proceeds to S199.

Furthermore, when the above-described interaction control apparatus 200 receives a negative reaction of the user to the content of an utterance output, the interaction control apparatus 200 selects and executes another remotely related interaction block. At this time, when an interaction block to be executed next is selected in accordance with, for example, the number of interaction blocks or the like, in the case where there are a large number of interaction blocks based on a specific app or ICT service, only an interaction block based on the specific app or ICT service is selected in some cases.

Thus, in this embodiment, an app or ICT service on which an interaction block to be executed is based is specified first so that only an interaction block based on the same app or ICT service is not selected, and an interaction block is selected from among interaction block candidates based on the specified app or ICT service.

Figure 8A:
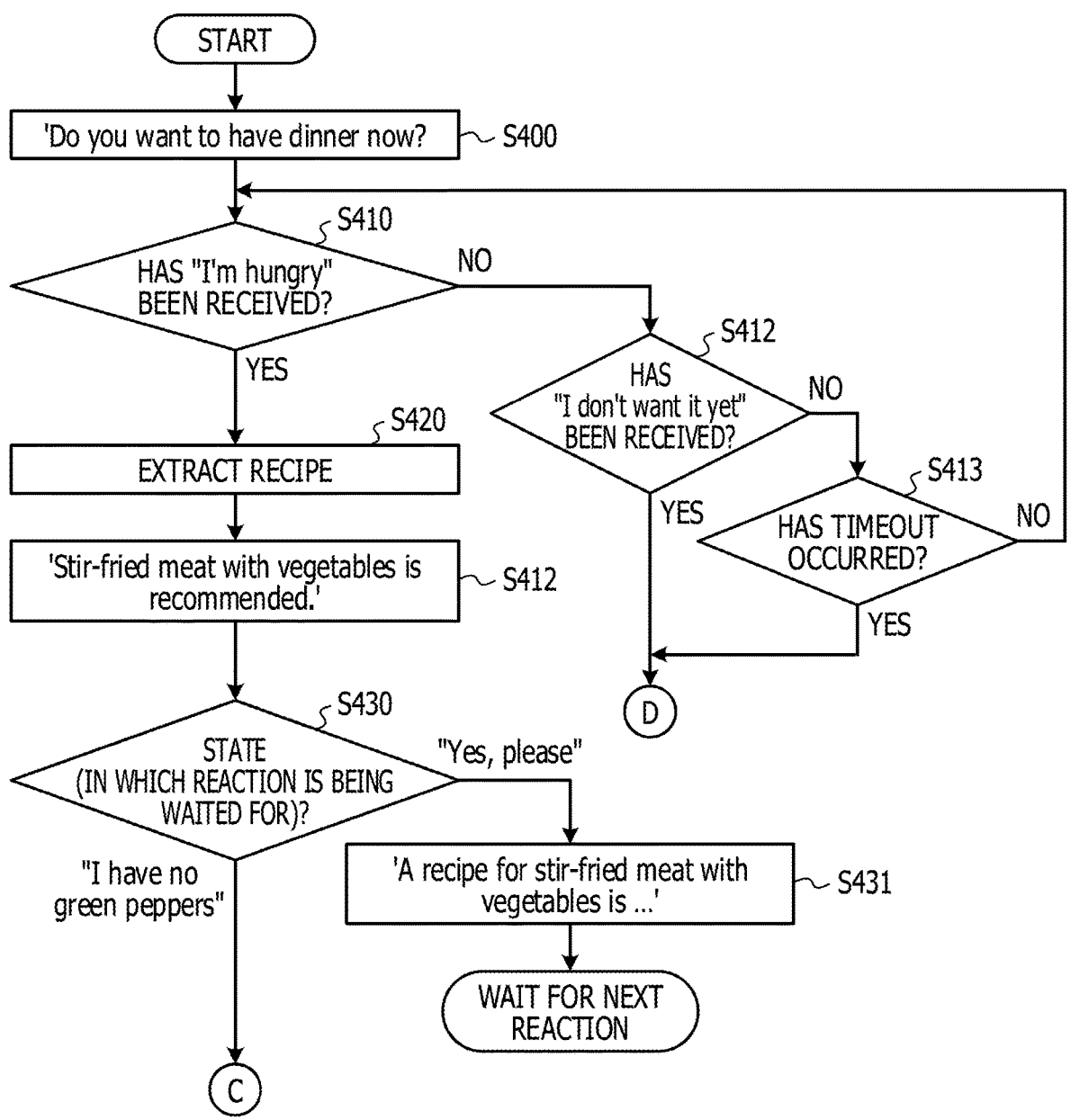
FIGS. 8A and 8B are a flowchart illustrating an example of a flow of an interaction in the second embodiment.
Figure 8B:
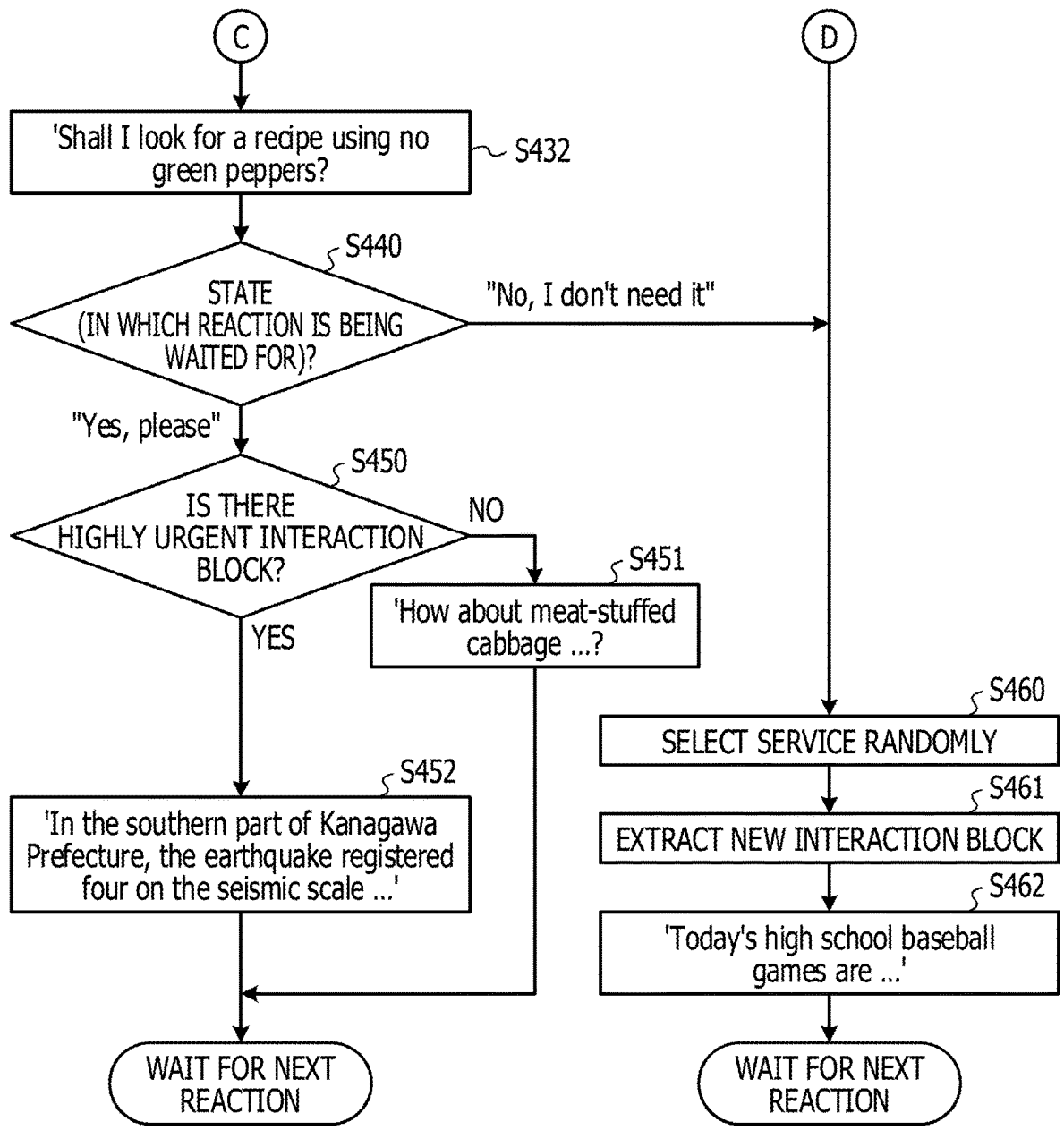

A flow of an interaction in this embodiment will be described with reference to FIG. 8. FIG. 8 (i.e. FIGS. 8A and 8B) is a flowchart illustrating an example of a flow of an interaction in the second embodiment. In the example illustrated in FIG. 8, the interaction control apparatus 200 selects an interaction block including the content of an utterance, such as "Do you want to have dinner now?", and causes the interaction block to be uttered (S400). Then, the interaction control apparatus 200 determines whether it has received an affirmative reaction, such as "I'm hungry", to the content of the utterance (S410).

When the interaction control apparatus 200 determines that it has not received any affirmative reaction (No in S410), the interaction control apparatus 200 determines whether it has received a negative reaction, such as "I don't want it yet", (S412). When the interaction control apparatus 200 determines that it has not received any negative reaction (No in S412), the interaction control apparatus 200 waits until a timeout occurs (No in S413). When the interaction control apparatus 200 determines that it has received a negative reaction (Yes in S412), or when the interaction control apparatus 200 determines that a timeout has occurred (Yes in S413), the interaction control apparatus 200 proceeds to S460.

On the other hand, when the interaction control apparatus 200 determines that it has received an affirmative reaction to the content of the utterance (Yes in S410), the interaction control apparatus 200 extracts, with reference to the block DB 221, an interaction block including, as the content of an utterance, a recipe (S420). Then, the interaction control apparatus 200 executes an interaction block including the content of an utterance, such as 'Stir-fried meat with vegetables is recommended.', (S421), and waits until the user makes a reaction (S430).

When the interaction control apparatus 200 receives an affirmative reaction, such as "I'll have that", for example ("I'll have that" in S430), the interaction control apparatus 200 executes a next interaction block. In this embodiment, the interaction control apparatus 200 executes an interaction block including the content of an utterance about a recipe for stir-fried meat with vegetables (S431). Then, the interaction control apparatus 200 waits until the user makes a next reaction.

On the other hand, when the user makes a negative reaction, such as "I have no green peppers", ("I have no green peppers" in S430), the interaction control apparatus 200 executes a next interaction block. In this embodiment, the interaction control apparatus 200 selects and executes an interaction block including the content of an utterance, such as 'Shall I look for a recipe using no green peppers?', (S432), and waits for a next reaction (S440).

In this case, when the user makes an affirmative reaction, such as "Yes, please", ("Yes, please" in S440), the interaction control apparatus 200 determines whether there is a highly urgent interaction block (S450). When the interaction control apparatus 200 determines that there is no highly urgent interaction block (No in S450), the interaction control apparatus 200 causes the content of an utterance about suggestion of another recipe to be output, such as 'How about meat-stuffed cabbage . . . ?', for example (S451), and waits for a next reaction.

On the other hand, when the interaction control apparatus 200 determines that there is a highly urgent interaction block (Yes in S450), the interaction control apparatus 200 selects and executes the highly urgent interaction block. In this embodiment, the interaction control apparatus 200 selects and executes an interaction block including, as the content of an utterance, highly urgent information, such as 'In the southern part of Kanagawa Prefecture, the earthquake registered four on the seismic scale . . . ', (S452), and waits for a next reaction.

When the interaction control apparatus 200 receives a negative reaction in S412 (Yes in S412), or when the interaction control apparatus 200 detects the occurrence of a timeout (Yes in S413), the interaction control apparatus 200 randomly selects an app or web service on which a candidate for a next interaction block is based (S460). The interaction control apparatus 200 extracts a new interaction block from the selected app or web service (S461). In this embodiment, the interaction control apparatus 200 selects an interaction block including the content of an utterance, such as 'Today's high school baseball games are . . . ', for example, different from the interaction block illustrated in S251 of FIG. 5 (S462), and waits for a next reaction.

In the above-described flow of an interaction, although the case has been described where a determination is made in S450 whether there is a highly urgent interaction block, a timing at which the determination is made is not limited to this. The determination may be made at any timing, such as a timing after S410 or S430.

As described above, when selection of a next interaction block is specified as a response, the interaction control apparatus in this embodiment determines whether there is an interaction block serving as a highly urgent utterance candidate. When the interaction control apparatus determines that there is an interaction block serving as a highly urgent utterance candidate, the interaction control apparatus preferentially selects the interaction block serving as a highly urgent utterance candidate. This enables highly urgent information to be preferentially provided.

Furthermore, the interaction control apparatus in this embodiment randomly selects an ICT service on which generation of an interaction block is based. The interaction control apparatus selects, from among interaction blocks generated from web content of the selected ICT service, an interaction block remotely related to an interaction block to which the user has reacted. Thus, information related to a service demanded by the user may be provided without favoring an interaction block based on a specific app or ICT service.

An interaction block stored in the block DB 221 may be, for example, information acquired from an external computer, or may be input by an administrator of the interaction control apparatus 200, which is not illustrated.

[System]

In the above-described embodiments, although the case has been described where the interaction robot includes the communication unit, the storage unit, and the control unit to thereby implement the interaction control apparatus 200, the disclosed technique is not limited to this. For example, the interaction control apparatus 200 may be implemented by a fixed terminal, such as a personal computer (PC), or a mobile terminal, such as a mobile phone, a personal handy-phone system (PHS), or a personal digital assistant (PDA). For example, in the case where the interaction control apparatus 200 is implemented by a fixed terminal or a mobile terminal, an utterance may be detected by using a moving image from a camera installed in the upper part or the like of a display.

The components of each device or apparatus illustrated in FIG. 2 do not have to be physically configured as illustrated in FIG. 2. That is, a specific form in which components of each device or apparatus are distributed or integrated is not limited to that illustrated in FIG. 2. All or some of the components may be functionally or physically distributed or integrated in any unit in accordance with various loads, usage states, and so forth. For example, the processing units of the control unit 230 may be appropriately integrated. Furthermore, a process performed by each processing unit may be appropriately separated into processes performed by a plurality of processing units. Additionally, all or any of processing functions performed by the processing units may be implemented by a CPU and a program to be analyzed and executed by the CPU, or may be implemented as hardware using wired logic.

Furthermore, the various processes described in the above-described embodiments may be implemented by causing a computer, such as a personal computer or workstation, to execute a program prepared in advance. Thus, an example of a computer that executes an interaction control program having the same functions as those in the above-described embodiments will be described below with reference to FIG. 9.

Figure 9:
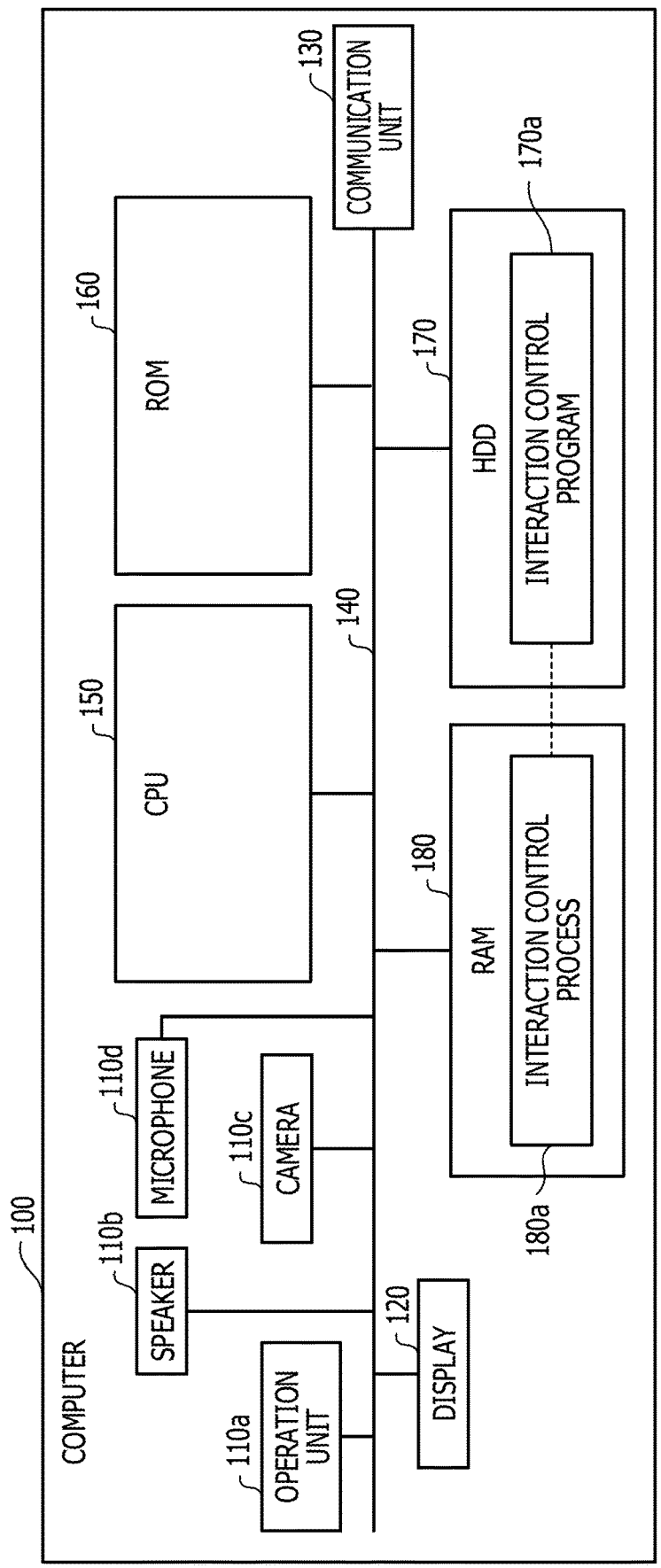
FIG. 9 illustrates an example of a computer that executes an interaction control program.

FIG. 9 illustrates an example of a computer that executes an interaction control program. As illustrated in FIG. 9, a computer 100 includes an operation unit 110a, a speaker 110b, a camera 110c, a microphone 110d, a display 120, and a communication unit 130. The computer 100 further includes a CPU 150, a ROM 160, an HDD 170, and a RAM 180. The units denoted by 110a to 110d and 120 to 180 are connected via a bus 140.

The HDD 170 stores, in advance, an interaction control program 170a that exhibits the same functions as the processing units of the interaction control apparatus 200. With respect to the interaction control program 170a, integration or separation may be appropriately performed as in the components described in the above embodiments. That is, with respect to pieces of data stored in the HDD 170, not all the pieces of data have to be stored in the HDD 170 at all times. Only data used for a process may be stored in the HDD 170.

Then, the CPU 150 reads the interaction control program 170a from the HDD 170 and loads the interaction control program 170a into the RAM 180. Thus, the interaction control program 170a functions as an interaction control process 180a. The interaction control process 180a loads various pieces of data read from the HDD 170 into an area appropriately allocated to itself in the RAM 180 and executes various processes based on the loaded various pieces of data. The interaction control process 180a includes processes executed by the processing units of the interaction control apparatus 200, for example, the processes illustrated in FIG. 2. Furthermore, with respect to the processing units implemented virtually on the CPU 150, not all the processing units have to operate on the CPU 150 at all times. Only a processing unit used for a process may be implemented virtually.

The above-described interaction control program 170a does not have to be stored in the HDD 170 or the ROM 160 from the beginning. For example, programs are stored in "portable physical media", which are inserted into the computer 100, such as a flexible disk that is called an FD, a compact disc read only memory (CD-ROM), a digital versatile disk (DVD), a magnetic optical disk, and an integrated circuit (IC) card. Then, the computer 100 may acquire each program from the portable physical media and execute the program. Furthermore, each program is stored in another computer, a server device, or the like connected to the computer 100 via a public network, the Internet, a local area network (LAN), a wide area network (WAN), or the like, and the computer 100 may acquire the program from the other computer, the server device, or the like and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An interaction control method performed by a computer, the method comprising:
    executing a generation process that includes
        collecting one or more of web contents from one or more of information and communication technology (ICT) services on the Internet,
        obtaining, for each of the one or more of ICT services, one or more of interaction blocks by decomposing each of the collected one or more of web contents into the one or more of interaction blocks, each interaction block being a text component including an interaction unit corresponding to one interaction with a user, each interaction block being associated with the respective ICT service,
    executing a selection process that includes
        selecting first interaction block from among the one or more of interaction blocks, and
        outputting a message to the user by using the selected first interaction block as a part of a conversation with the user;
    executing a determination process that includes
        receiving, in response to the outputting of the message, an input signal from the user, and
        determining a reaction of a user to the outputted message; and
    executing a response process that includes
        selecting, in response to a determination result indicating that the reaction of the user satisfies a first condition, a second interaction block to be used to output a next message to the user, the second interaction block being any of the one or more of interaction blocks relating to the first interaction block, and
        selecting, in response to a determination result indicating that the reaction of the user satisfies a second condition, a third interaction block to be used to output the next message to the user, the third interaction block being any of the one or more of interaction blocks associated with a first ICT service, the first ICT service being randomly selected from among the one or more of ICT services.

2. The interaction control method according to claim 1, wherein the generation process is configured to
    search for a web content of any of the one or more of ICT services on the Internet; and
    generate the interaction block by decomposing the searched web content of the ICT service into one back-and-forth interaction, the one back-and-forth interaction including a content of utterance and a conceivable reaction of user, and wherein the response process is configured to cause the generation process to generate the interaction block based on the result of the determination process, and select the generated interaction block.

3. The interaction control method according to claim 1, the method further comprising:

executing a candidate management process that includes managing the interaction block, the interaction including an interaction action, a condition for identifying a reaction of the user to the interaction action, and a definition of and an execution condition for a system action to be executed in response to the reaction of the user; and executing a context management process that includes managing a context of an interaction and a user profile, wherein the response process is configured to select the interaction block as the next element by using the context of the interaction and the user profile.

4. The interaction control method according to claim 3, the interaction control method further comprising:

executing an execution process that includes executing the selected interaction block based on the execution condition included in the selected interaction block; and executing an interpretation process that includes interpreting a reaction of the user to the executed interaction block, and causing a result of the interpretation to be reflected to the context management process, wherein the response process is configured to select the next element based on the result of the interpretation.

5. The interaction control method according to claim 1, wherein the response process is configured to determine whether there is the interaction block serving as a highly urgent utterance candidate, when selection of the interaction block is specified as selection of the next element, and select the interaction block serving as the highly urgent utterance candidate, when there is the interaction block serving as the highly urgent utterance candidate.

6. The interaction control method according to claim 2, wherein the response process is configured to select a first interaction block related to a second interaction block, the second interaction block being reacted by the user among the one or more of interaction blocks, when the reaction of the user is determined as an affirmative reaction or a conceivable reaction, select a third interaction block remotely related to the second interaction block among the one or more of interaction blocks, when the reaction of the user is determined as a negative reaction or an inconceivable reaction.

7. The interaction control method according to claim 6, wherein the response process is configured to randomly selects the ICT service which provides the web content from which the interaction block is generated by the generation process, select, from among interaction blocks generated from web content of the selected ICT service, an interaction block remotely related to an interaction block to which the user has reacted.

8. An interaction control apparatus comprising:
a memory; and
a processor coupled to the memory and configured to:
execute a generation process that includes
collecting one or more of web contents from one or more of information and communication technology (ICT) services on the Internet,
obtaining, for each of the one or more of ICT services, one or more of interaction blocks by decomposing each of the collected one or more of web contents into the one or more of interaction blocks, each interaction block being a text component including an interaction unit corresponding to one interaction with a user, each interaction block being associated with the respective ICT service;
execute a selection process that includes
selecting first interaction block from among the one or more of interaction blocks, and
outputting a message to the user by using the selected first interaction block as a part of a conversation with the user;
execute a determination process that includes
receiving, in response to the outputting of the message, an input signal from the user, and
determining a reaction of a user to the outputted interaction message; and
execute a response process that includes
selecting, in response to a determination result indicating that the reaction of the user satisfies a first condition, a second interaction block to be used to output a next message to the user, the second interaction block being any of the one or more of interaction blocks relating to the first interaction block, and
selecting, in response to a determination result indicating that the reaction of the user satisfies a second condition, a third interaction block to be used to output the next message to the user, the third interaction block being any of the one or more of interaction blocks associated with a first ICT service, the first ICT service being randomly selected from among the one or more of ICT services.

9. The interaction control apparatus according to claim 8, wherein the generation process is configured to search for a web content of any of the one or more of ICT services on the Internet; and generate the interaction block by decomposing the searched web content of the ICT service into one back-and-forth interaction, the one back-and-forth interaction including a content of utterance and a conceivable reaction of user, and wherein the response process is configured to cause the generation process to generate the interaction block based on the result of the determination process, and select the generated interaction block.

10. The interaction control apparatus according to claim 8, wherein the processor is further configured to:

execute a candidate management process that includes managing the interaction block, the interaction including an interaction action, a condition for identifying a reaction of the user to the interaction action, and a definition of and an execution condition for a system action to be executed in response to the reaction of the user; and execute a context management process that includes managing a context of an interaction and a user profile, wherein the response process is configured to select the interaction block as the next element by using the context of the interaction and the user profile.

11. The interaction control apparatus according to claim 10,
wherein the processor is further configured to:
execute an execution process that includes executing the selected interaction block based on the execution condition included in the selected interaction block; and
execute an interpretation process that includes interpreting a reaction of the user to the executed interaction block, and causing a result of the interpretation to be reflected to the context management process,
wherein the response process is configured to select the next element based on the result of the interpretation.

12. The interaction control method according to claim 8,
wherein the response process is configured to
determine whether there is the interaction block serving as a highly urgent utterance candidate, when selection of the interaction block is specified as selection of the next element, and
select the interaction block serving as the highly urgent utterance candidate, when there is the interaction block serving as the highly urgent utterance candidate.

13. The interaction control apparatus according to claim 9,
wherein the response process is configured to
select a first interaction block related to a second interaction block, the second interaction block being reacted by the user among the one or more of interaction blocks, when the reaction of the user is determined as an affirmative reaction or a conceivable reaction,
select a third interaction block remotely related to the second interaction block among the one or more of interaction blocks, when the reaction of the user is determined as a negative reaction or an inconceivable reaction.

14. The interaction control apparatus according to claim 13,
wherein the response process is configured to
randomly selects the ICT service which provides the web content from which the interaction block is generated by the generation process,
select, from among interaction blocks generated from web content of the selected ICT service, an interaction block remotely related to an interaction block to which the user has reacted.

15. A non-transitory computer-readable storage medium for storing an interaction control program, the interaction control program causing a processor to execute a process, the process comprising:
executing a generation process that includes
collecting one or more of web contents from one or more of information and communication technology (ICT) services on the Internet,
obtaining, for each of the one or more of ICT services, one or more of interaction blocks by decomposing each of the collected one or more of web contents into the one or more of interaction blocks, each interaction block being a text component including an interaction unit corresponding to one interaction with a user, each interaction block being associated with the respective ICT service,
executing a selection process that includes
selecting first interaction block from among the any of one or more of interaction blocks, and
outputting a message to the user by using the selected first interaction block as a part of a conversation with the user;
executing a determination process that includes
receiving, in response to the outputting of the message, an input signal from the user, and
determining a reaction of a user to the outputted message; and
executing a response process that includes
selecting, in response to a determination result indicating that the reaction of the user satisfies a first condition, a second interaction block to be used to output a next message to the user, the second interaction block being any of the one or more of interaction blocks relating to the first interaction block, and
selecting, in response to a determination result indicating that the reaction of the user satisfies a second condition, a third interaction block to be used to output the next message to the user, the third interaction block being any of the one or more of interaction blocks associated with a first ICT service, the first ICT service being randomly selected from among the one or more of ICT services.

16. The non-transitory computer-readable storage medium according to claim 15,
wherein the generation process is configured to
search for a web content of any of the one or more of ICT services on the Internet; and
generate the interaction block by decomposing the searched web content of the ICT service into one back-and-forth interaction, the one back-and-forth interaction including a content of utterance and a conceivable reaction of user, and
wherein the response process is configured to
cause the generation process to generate the interaction block based on the result of the determination process, and
select the generated interaction block.

17. The non-transitory computer-readable storage medium according to claim 15, wherein the process further includes:
executing a candidate management process that includes managing the interaction block, the interaction including an interaction action, a condition for identifying a reaction of the user to the interaction action, and a definition of and an execution condition for a system action to be executed in response to the reaction of the user; and
executing a context management process that includes managing a context of an interaction and a user profile,
wherein the response process is configured to select the interaction block as the next element by using the context of the interaction and the user profile.

18. The non-transitory computer-readable storage medium according to claim 17, wherein the process further includes:
executing an execution process that includes executing the selected interaction block based on the execution condition included in the selected interaction block; and
executing an interpretation process that includes interpreting a reaction of the user to the executed interaction block, and causing a result of the interpretation to be reflected to the context management process, wherein the response process is configured to select the next element based on the result of the interpretation.

19. The non-transitory computer-readable storage medium according to claim 15, wherein the response process is configured to determine whether there is the interaction block serving as a highly urgent utterance candidate, when selection of the interaction block is specified as selection of the next element, and select the interaction block serving as the highly urgent utterance candidate, when there is the interaction block serving as the highly urgent utterance candidate.

20. The non-transitory computer-readable storage medium according to claim 16, wherein the response process is configured to select a first interaction block related to a second interaction block, the second interaction block being reacted by the user among the one or more of interaction blocks, when the reaction of the user is determined as an affirmative reaction or a conceivable reaction, select a third interaction block remotely related to the second interaction block among the one or more of interaction blocks, when the reaction of the user is determined as a negative reaction or an inconceivable reaction.

\* \* \* \* \*